United States Patent [19]
Beck

[11] 3,918,043
[45] Nov. 4, 1975

[54] POWER SUPPLY MONITOR
[75] Inventor: Francis J. Beck, Schurchville, Pa.
[73] Assignee: Honeywell Inc., Minneapolis, Minn.
[22] Filed: Mar. 18, 1974
[21] Appl. No.: 452,790

[52] U.S. Cl. .................... 340/248 B; 317/148.5 R
[51] Int. Cl.² .................. G08B 21/00; H01H 47/32
[58] Field of Search.................. 340/249, 253, 248; 317/148.5 R

[56] References Cited
UNITED STATES PATENTS
3,813,667  5/1974  Smith ...................... 340/248 B X

*Primary Examiner*—John W. Caldwell
*Assistant Examiner*—Daniel Myer
*Attorney, Agent, or Firm*—Arthur H. Swanson; Lockwood D. Burton; Mitchell J. Halista

[57] ABSTRACT

A power-down monitor circuit senses the imminent loss of a primary power supply output signal and produces a control signal in response thereto as an alarm signal for associated equipment supplied by the primary power supply. The monitor circuit uses a lower level of the primary power supply output signal to perform control operations before a total loss of primary power supply output signal is experienced. Restoration of the primary power supply output signal is monitored and data handling operations are delayed until a desired level of the output signal is reached to assure proper operation of the associated data handling equipment.

5 Claims, 2 Drawing Figures

POWER SUPPLY MONITOR

BACKGROUND OF THE INVENTION

1. Field of the Invention

The present invention relates to power monitor circuits. More specifically, the present invention is directed to a power-down monitor circuit for producing an alarm signal indicative of the imminent loss of power supplied from a power source. Monitor circuits of this type may be found in Class 317 and Subclass 31 of the United States Patent Office classification system.

2. Description of the Prior Art

Power supplies for data handling electronic equipment are highly regulated and precise supplies to avoid errors in the data-handling operations, particularly in arithmetic or central processing units (CPU). However, in order to prevent a failure of the effect of the data handling operation either with respect to the validity of the data or the control function performed by the data, it is necessary to detect the presence of an imminent power failure and to terminate the data handling operations at a time consistent with the error-free data handling operations. In other words, the detection of an imminent power-down situation allows the data handling operations to be interrupted before an error can occur as a result of the gradual loss of power and before the stored data is either lost or altered, i.e., the system can be placed in data handling state. Further, it is necessary that the restoration of power following a power-down state is monitored until full operating power is restored before the data-handling operations are resumed to prevent an erroneous operation due to the lack of an adequate supply of power during a transient state of the power restoration.

SUMMARY OF THE INVENTION

The object of the present invention is to provide a power-down monitor for producing an alarm signal indicative of an imminent power loss from a power supply.

In accomplishing this and other objects, there has been provided, in accordance with the present invention, a power-down monitor circuit arranged to produce an alarm output signal indicative of the decrease in the level of a power supply line being monitored. The alarm signal is generated by the detection of a decrease in the power supply line being monitored to a first level voltage being monitored and is effective to produce a first control action by the power monitor circuit. The detection of a second lower level in the power supply line being monitored is arranged to produce a second control action by the power monitor circuit. The reinstatement of a desired operating level of the power supply line being monitored, after the loss of the desired operating level is also monitored to produce a termination of the alarm signals from the power monitor circuit to the apparatus utilizing the power supplied by the power supply line after a predetermined time interval.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

DETAILED DESCRIPTION

Figure 1:
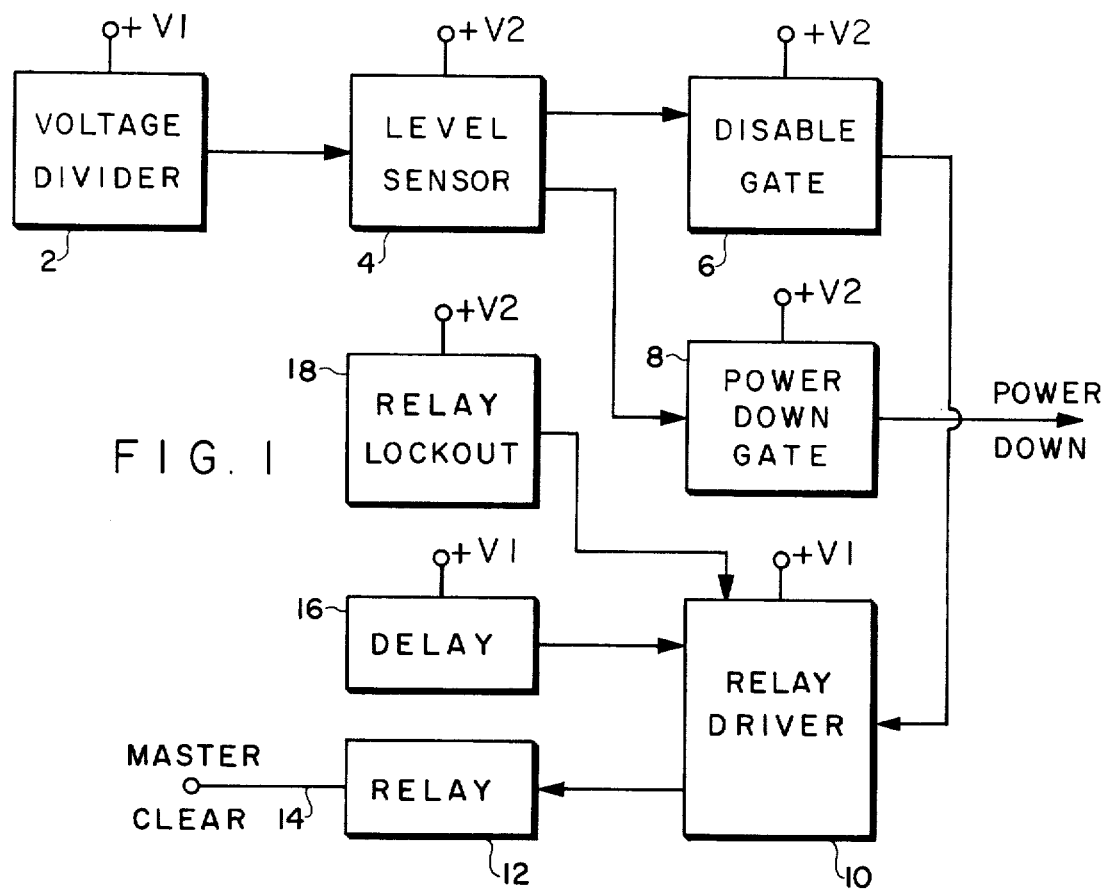
FIG. 1 is a block diagram of a power-down monitor circuit embodying the present invention.

Referring to FIG. 1 in more detail, there is shown a block diagram of a power-down monitor circuit embodying the present invention to provide a first output signal, i.e., "Power Down" on a first output line indicative of an imminent loss of voltage on a voltage line being monitored and a second output signal, i.e., "Master Clear" on a second output line. These output signals are applied to associated data handling equipment as control signals to prepare this equipment for the imminent loss of power. The primary power is identified as +V1 and is monitored through a voltage divider 2 by a level sensor 4. A secondary power source is identified as +V2 and is supplied at a lower level than the primary power, e.g., 5 volts for the secondary power versus 25 volts for the primary power. The secondary power supply is supplied by the primary source and, accordingly, is able to continue functioning during the decline of the primary power source until the primary power source has fallen to a level at which the secondary power source is also interrupted. This secondary source +V2 is used to power the level sensor 4 to assure the presence of an output signal from the level sensor following the decline of the primary power source +V1 to an alarm condition level as sensed by the level sensor 4.

A pair of output signals from the level sensor 4 are applied to respective gate circuits supplied by the secondary source +V2, i.e., disable gate 6 and power down gate 8. An output signal from the power down gate 8 is applied as a "Power Down" output signal from the power-down monitor circuit. An output signal from the disable gate 6 is applied as an input signal to a relay driver circuit 10. The relay driver circuit 10 is arranged to actuate a relay 12 to produce the "Master Clear" output signal from the power-down monitor circuit. The "Master Clear" signal is a "low" level signal, e.g., a ground connection on the "Master Clear" output line. The relay driver 10 is connected to the primary power source +V1 while a signal delay, or storage, circuit is arranged to supply a bias signal to the relay driver 10 over an extended period of time during the decline of the primary power supply signal +V1. The delay circuit 16 is also utilized during a restoration of the primary power source output signal +V1 by allowing this signal to be restored to its proper operating level for a period of time preceding the operation of the relay driver 10 to insure that the secondary power signal +V2 is at a proper operating level. A relay lockout circuit 18 is also connected to the relay driver 10 to prevent operation of the relay 14 to remove the "Master Clear" signal until the secondary power signal +V2 has been restored to a proper operating level. Thus, the "Master Clear" signal will be retained until the secondary supply signal +V2 is restored as well as the primary power supply signal +V1.

MODE OF OPERATION

The power-down monitor of the present invention is arranged to sense the loss of a signal on the +V1 line, which is the main power supply output signal, and to provide an initial warning signal, i.e., "Power Down" to associated equipment, e.g., a digital computer, of the imminent loss of this main power supply output signal. An advance warning of this power failure of at least twenty micro-seconds has been found to be desirable to allow the associated equipment to complete its current dataprocessing operations and to initiate a power-down mode of operation to preserve stored data and commands. The power-down monitor circuit is connected to the primary supply signal +V1 through a voltage divider circuit 2 having an output signal applied to the level sensor circuit 4. When this level sensor circuit 4 detects a drop in the level of the signal on the +V1 line, e.g., a drop from a normal 25 volt signal to a 15 volt signal, the level sensor circuit 4 produces a corresponding change in an output signal on its output lines. The output signal from the level sensor 4 is applied to two gate circuits identified as a disable gate 6 and a power-down gate 8.

The output signal from the power-down gate 8 is applied directly as a power-down signal represented by a logical 0 signal level to associated data handling equipment. The output signal from the disable gate circuit 6, on the other hand, is applied to a driver circuit 10 to terminate the energization of a relay circuit 12. The loss of energization to the relay circuit 12 is effective, in turn, to produce a low level output signal on the "Master Clear" output line 14 from the relay circuit 12, e.g., the "Master Clear" line 14 may be grounded by the relay 12. In a typical operation, the signal delay time through the level sensor 4 and the power-down gate 8 is a maximum of 50 nano seconds while the time required for the +V1 line to reach a level at which the secondary power supply signal +V2 to the level sensor 4 and the power-down gate 8 is terminated in 8.44 milliseconds. The difference between the set two times is approximately 8.43 milliseconds which is substantially more than the 20 microseconds required on the "Power Down" output line to provide an advance warning to the associated data handling equipment.

The other output signal from the level sensor 4 is applied through the disable gate 6 to the relay driver 10 to disable the relay 12 whereby to produce a low level output signal on the "Master Clear" output line 14. The delay time through these circuits includes the operating time of the relay driver 10 and the drop-out time of the relay contacts. The relay drop-out time is one millisecond which is added to a contact bounce time of 4 milliseconds for a total relay operating time of 5 milliseconds. The relay driver operating time is 250 microseconds which produces a total relay operating time of slightly over 5 milliseconds. This is substantially less than the 8.44 milliseconds representative of the time until the secondary source signal +V2 is terminated following a detection of a fault by the level sensor 4. Accordingly, the relay circuits are able to operate the relay 12 to produce a "Master Clear" signal while the secondary signal +V2 is still present and while the "Power Down" signal is present at the output of the power-down gate 8.

When the primary source supply signal +V1 is restored, the delay circuit 16 is arranged to provide a delay time of 800 milliseconds before the relay 12 can be re-energized by delaying the application of the primary source signal +V1 to the relay driver circuit 10. This delay time allows the secondary source signal +V2 to reach its proper output level. The secondary source signal +V2 has a time constant of approximately 6 milliseconds in reaching its operating level which with an appropriate safety factor is substantially less than the aforesaid 800 milliseconds. Thus, before the "Master Clear" signal is removed, the primary and secondary sources will at their proper operating levels to assure proper operation of the associated data handling equipment.

The relay lockout circuit 18 is provided to cover the contingency of having the primary source signal +V1 present at its operating level while the secondary source signal +V2 has failed to be restored. The relay lockout circuit 18 will prevent the relay driver 10 from operating by introducing an open circuit in a relay energization line until the secondary source signal +V2 is fully restored.

Figure 2:
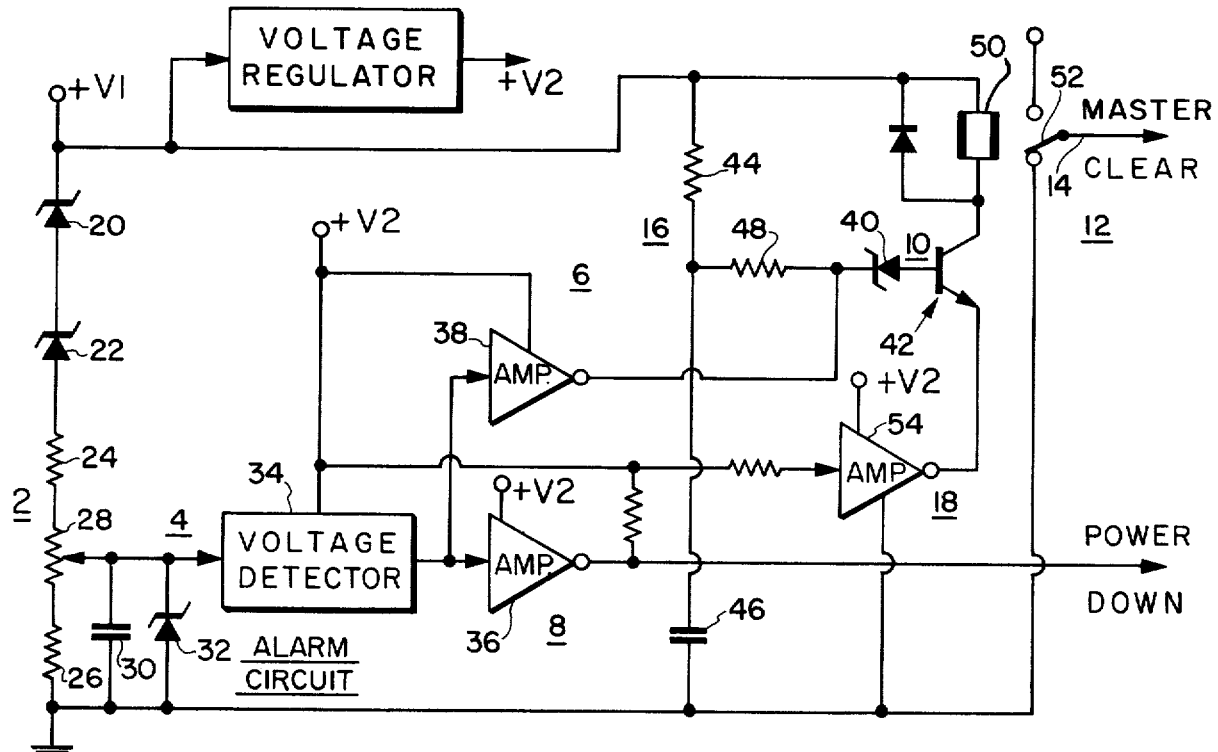
FIG. 2 is a schematic illustration of a circuit providing the functions shown in the block diagram of FIG. 1 and, also, embodying the present invention.

In FIG. 2, there is shown a schematic diagram of a circuit suitable for use as the power-down monitor circuit shown in FIG. 1. Reference numbers used in FIG. 1 have been reapplied to the schematic diagram of FIG. 2 to generally indicate the circuit elements previously described with respect to the operation of the power-down monitor circuit shown in FIG. 1. As shown in FIG. 2, the primary power source signal +V1 is connected through a serial pair of Zener diodes 20 and 22 to a voltage divider circuit 2 including a serial connection of a pair of signal limiting resistors 24 and 26 and a potentiometer 28 connected therebetween. The Zener diodes 20 and 22 serve as signal level shifters by regulating the output signal appearing across the potentiometer 28 to a level determined by the signal conduction level of the Zener diodes 20 and 22. An output signal from the voltage divider 2 is taken from the slider of the potentiometer 28 and is applied across a parallel combination of a capacitor 30 and a third Zener diode 32 and to a voltage detector 34. This combination serves to maintain the input signal to the voltage detector 34, e.g., a Schmidt trigger circuit, above the triggering level of the voltage detector 34 when the level of the primary power source signal +V1 is at a desired operating level. When the level of a primary power source output signal falls below this desired operating level, the input signal to the voltage detector 34 is permitted to follow whereby the output signal of the voltage detector 34 changes state to a high level output signal. This high level output signal from the voltage detector 34 is applied to a pair of logical inverter circuits 36 and 38. The output signal from a first logical inverter circuit 36 is taken as the "power-down" output signal.

The output signal from the other logical inverter circuit 38 is applied as an input signal through a fourth Zener diode 40 to the base of a relay drive transistor 42. This signal is in opposition to a bias signal normally applied to the base of the relay drive transistor 42 from the primary power source output signal +V1 through a resistor 44. This signal from the primary source +V1 is also stored on a capacitor 46 which has one end connected to the Zener diode 40 through a resistor 48 to form an RC network. The signal stored in the capacitor 46 is used to normally maintain the transistor 42 in a current carrying condition whereby a current is supplied from the collector of the transistor 42 to one end of a relay coil 50. The other end of the relay coil 50 is connected to the primary power source +V1. The relay coil 50 is effective to maintain a relay contact 52 in an actuated state whereby the "Master Clear" line is maintained above a level, or ground, state. The emitter return line for the relay drive transistor 42 is established through a third logical inverter circuit 54. The third logical inverter circuit 54 is energized by a signal from the secondary power supply source +V2 and is used as a relay lockout circuit 18 by controlling the emitter return path of the transistor 42, as previously described. Thus, the circuit shown in FIG. 2 is effective to produce the operation previously described with respect to FIG. 1 to provide a power-down monitor circuit for monitoring a primary source output signal +V1.

Accordingly, it may be seen that there has been provided, in accordance with the present invention, a power-down monitor circuit for monitoring a primary power source output signal and for producing an alarm signal indicative of an imminent power loss from the primary power source while controlling the subsequent removal of the alarm signal to insure a full restoration of the primary power source signal following a loss of the primary power source signal.

The embodiments of the invention in which an exclusive property or privilege is claimed are defined as follows:

1. A power-down monitor circuit comprising:
   detection means for monitoring a primary power source output signal and for producing an output signal indicative of an imminent loss of the power source output signal,
   alarm means responsive to said output signal from said detection means for producing a control signal representative of an imminent loss of the primary power source output signal and
   energizing means for energizing said alarm means with a secondary power source output signal derived from said primary power source output signal and having a signal level below a signal level detected by said detection means to produce said first-mentioned output signal.

2. A power-down monitor circuit as set forth in claim 1 and including a second alarm means responsive to said detection means for producing a second alarm signal, said second means being energized by said energizing means.

3. A power-down monitor circuit as set forth in claim 1 wherein said alarm means responsive to said detection means includes relay means and relay driver means arranged to de-energize said relay upon the occurrence of said output signal from said detection means.

4. A power-down monitor circuit as set forth in claim 3 and including a relay lock-out circuit arranged to be energized by said energizing means and including means for preventing reenergization of said relay by said relay driver means following a loss of the primary power source output signal until a restoration of the energization by said energizing means.

5. A power-down monitor circuit as set forth in claim 3 and including a delay circuit for maintaining a power supply level signal derived from said primary power supply output signal to said relay driver means for a predetermined period of time following the production of an output signal by said detection means for preventing operation of said relay driver means for a predetermined period of time following a restoration of the primary power supply output signal.

* * * * *